(12) United States Patent
Fisk

(10) Patent No.: US 12,077,022 B1
(45) Date of Patent: Sep. 3, 2024

(54) COUPLER APPARATUS

(71) Applicant: C. Tyson Fisk, Coarsegold, CA (US)

(72) Inventor: C. Tyson Fisk, Coarsegold, CA (US)

( * ) Notice: Subject to any disclaimer, the term of this patent is extended or adjusted under 35 U.S.C. 154(b) by 799 days.

(21) Appl. No.: 17/169,308

(22) Filed: Feb. 5, 2021

Related U.S. Application Data

(63) Continuation-in-part of application No. 16/058,930, filed on Aug. 8, 2018, now Pat. No. 10,913,598.

(51) Int. Cl.
*B60D 1/04* (2006.01)
*B60D 1/52* (2006.01)

(52) U.S. Cl.
CPC ............... *B60D 1/04* (2013.01); *B60D 1/52* (2013.01)

(58) Field of Classification Search
CPC .................................... B60D 1/04; B60D 1/52
See application file for complete search history.

(56) References Cited

U.S. PATENT DOCUMENTS

| | | | | |
|---|---|---|---|---|
| 4,384,817 A | * | 5/1983 | Peterson | B60P 3/125 280/402 |
| 6,099,017 A | * | 8/2000 | Schooler | B60D 1/28 280/510 |
| 9,868,326 B2 | * | 1/2018 | Najarro | B60D 1/04 |
| 9,908,738 B1 | | 3/2018 | Toth | |
| 10,913,598 B2 | | 2/2021 | Fisk | |
| 2017/0334257 A1 | * | 11/2017 | Stickles | B60D 1/04 |
| 2018/0134104 A1 | * | 5/2018 | Nagy | B60D 1/07 |
| 2019/0270353 A1 | * | 9/2019 | Mascola | B60D 1/04 |

FOREIGN PATENT DOCUMENTS

JP        2018034690 A  *  3/2018  ............... B60D 1/04

* cited by examiner

*Primary Examiner* — Minnah L Seoh
*Assistant Examiner* — Marlon A Arce
(74) *Attorney, Agent, or Firm* — BUCHALTER, PC; Cecily Anne O'Regan

(57) ABSTRACT

The apparatus is a grappling and coupler device that enables dynamic capture and transportation of wheeled devices, such as for example without limitation, multiple trash bins or material movers and the like, to be linked together so that all can be transported or moved together. The coupler or connector apparatus is a removable connector that is joined to a vehicle at one end and at the other includes retainer elements such as at least one hook that is/are configured to dynamically receive, capture, and/or engage an item, such as a handle of a bin or material mover. Additional material movers such as refuse/recycle bins can be linked into a train configuration to enable transport of multiple material movers.

20 Claims, 3 Drawing Sheets

COUPLER APPARATUS

CROSS REFERENCE TO RELATED PATENT APPLICATIONS

This application has common inventorship with, is co-owned and co-pending with, claims priority to, and is a continuation-in-part of U.S. non-provisional application Ser. No. 16/058,930 filed Aug. 8, 2018, now U.S. Pat. No. 10,913,598 granted Feb. 9, 2021, which is incorporated by reference herein in its entirety as though fully set forth herein.

TECHNOLOGICAL FIELD

The present disclosure relates generally to systems and methods for enabling vehicles to capture and tow various objects, including for example and without limitation trash, recycling, and yard waste bins, and similarly wheeled items.

BACKGROUND

Many municipalities require residents to use large wheeled trash or garbage bins for periodic, sometimes weekly, trash collection. Often these bins are color coded to represent different types of trash materials. For example, black bin might be for general trash and refuse. A green bin may be for plant material and/or yard waste, such as grass cuttings, trimmed branches, weeds, and the like. A blue bin may be designated for recyclable materials such as plastic, glass, cardboard, metal, and the like. Many such bins are large and have a volume that ranges between 32, 64, and 96 gallons or more, and become heavy when full, weighing sometimes in the hundreds of pounds or more.

Typically trash collection for a residential customer is one day each week, and the bins must be moved from an out of view location adjacent to a residence, and transported to and placed at the street side curb in front of the home, so that sanitation workers can collect the trash from the bins manually or by utilizing automated refuse truck machinery. Some homes, particularly in areas with large or steep and winding walkways and driveways, may be quite distant from the curb. Consequently, moving the bins to a street side curb can be a time consuming and difficult chore.

After trash has been collected, the bins are not permitted to simply be kept at the curb, but must be removed and returned to the out of view location soon after the trash has been picked up. This requirement results in a weekly routine of moving several large and heavy bins to the curb, and removing them after refuse has been collected.

SUMMARY

The apparatus is a connector or grappling device that allows multiple trash bins or other items to be linked together so that all can be moved simultaneously from one location to another, such as moving trash bins to a street side curb. The apparatus is a removable connector that is coupled to a vehicle at one end and engages an item, such as a handle of a trash bin at the other. Additional bins can be added to form a train with simple tie-downs, such as bungee or EPDM synthetic rubber (ethylene propylene diene monomer rubber) also sometimes referred to as trucker's cords. The apparatus can also be used to transport materials on skids, pallet trucks, or jacks, dollies, carts or wagons, and for towing and recovery applications.

This summary of the implementations and configurations of the contemplated coupler or connector apparatus describe in less technically detailed descriptions, several exemplary arrangements for the embodiments of this disclosure, and such are further described in more detail below in the detailed description in connection with the accompanying illustrations and drawings, and the claims that follow.

The disclosure contemplates a coupler or connector apparatus that includes a shaft extending longitudinally between opposite first and second ends, and with the first end having an anvil face that is angled at a predetermined angle relative to the longitudinally extending shaft. Also incorporated are at least one, one or more, or a pair of retainer elements such as hooks that are rotatably mounted at the first end of the shaft, and which are configured to cooperate with the first end and angled anvil face to receive and capture an item in the retainers or hooks and against the angled anvil face.

A D-ring is rotatably mounted in a collar at the first end of the shaft near and/or adjacent to at least one of the retainers or hooks. A heavy pin is received or receivable at the second end of the shaft and is configured to join the connector or coupler apparatus to a vehicle.

In modifications, a fastener is received within a through hole formed in the first end of the shaft, such that the at least one retainer elements or hook or hooks are rotatably mounted by the fastener about opposite sides of the shaft. In variations, the collar is mounted to or carried from the first end of the shaft, and is received with the D-ring in a friction fit relationship to resist movement relative to at least one of the retainer elements or hooks and/or the shaft.

In other adaptations, the collar and through hole are positioned relative to the at least one or pair of retainers or hooks such that the D-ring is rotatable into a position proximate the hooks to rest against the item retained or received within the retainer elements or hooks. Any of the configurations of the disclosure may include a fastener received within a through hole formed in the first end of the shaft to rotatably mount the at least one retainer elements or hook or hooks.

Also contemplated is the first end being formed with an upper edge and the angled anvil face, and configured to cooperate with the retainer elements or hooks or hooks during operation to be rotated into a position adjacent the retainers or hooks to retain the item received thereby and/or therein.

This summary is not intended to identify key features or essential features of the claimed technology and capabilities, nor is it intended to be used as an aid in determining the scope of the claimed technology and subject matter. The capabilities, advantages, variations, arrangements, modifications, features, and functions described here may be accomplished independently in various example configurations, and/or may be combined in yet other example implementations, as is further contemplated and explained elsewhere herein, and which may also be understood by those knowledgeable and having skill in the relevant fields of technology, and with reference to the following description and drawings.

BRIEF DESCRIPTION OF THE DRAWINGS

A more complete understanding of example implementations of the present disclosure may be derived by referring to the detailed description and claims when considered with the following figures, wherein like and similar reference numbers refer to similar, related, and/or identical elements throughout the figures. The figures and annotations thereon are provided to facilitate understanding of the disclosure without limiting the breadth, scope, scale, or applicability of the disclosure. The drawings are not necessarily made to scale and may be schematic diagrams intended to describe the disclosure to those knowledgeable in the relevant fields of technology.

DETAILED DESCRIPTION

Embodiments of the present disclosure are described herein. It is to be understood, however, that the disclosed embodiments are merely examples, and that other embodiments and alternative arrangements thereof can take other and preferably optional forms. The figures include some features that may be exaggerated or minimized to show or emphasize details of certain features, capabilities, constituents, components, and/or elements. Therefore, specific structural and functional details disclosed herein are not intended to be and must not be interpreted as limiting, but merely as a representative and illustrative basis for demonstrating to and teaching those skilled in the art to variously employ the embodiments of this disclosure.

As those of ordinary skill in the art should understand, various features, elements, constituents, capabilities, and components illustrated and described with reference to any one of the figures may be combined with features, components, elements, constituents, and methods illustrated in one or more other figures to produce embodiments that should be apparent to and within the knowledge of those skilled in the art, but which may not be explicitly illustrated or described. The combinations of features illustrated here are representative embodiments for many typical applications. Various combinations and modifications of the features consistent with the teachings of this disclosure, however, could be desired for particular applications or implementations, and should be readily within the knowledge, skill, and ability of those working in the relevant fields of technology.

Figure 1:
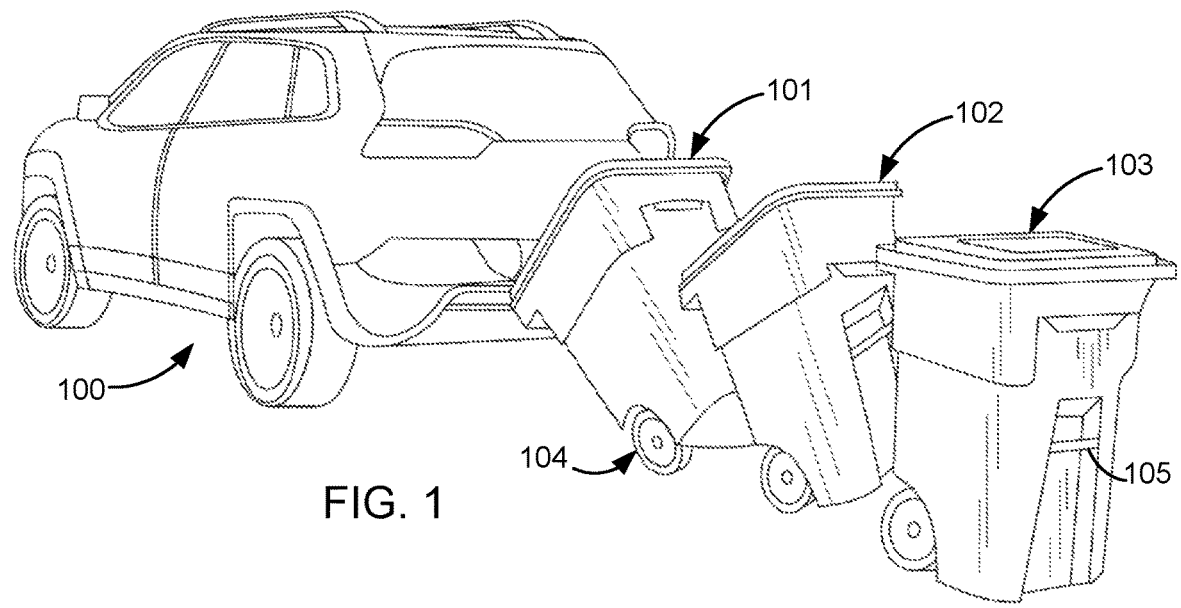
FIG. 1 is a view of a vehicle pulling a train of trash bins using the apparatus of the disclosure.

With reference now to the various figures and illustrations and to FIGS. 1, 2, 3, 4, and 5, connector or coupler apparatus 200 provides a reliable fastening means for a plurality of items, including, but not limited to, a trash bin. FIG. 1 is an example of the apparatus in use in connecting a plurality of bins. A vehicle 100 uses the apparatus to couple the rear of the vehicle to a first bin 101. The bin 101, in turn, is coupled to a second bin 102. The second bin 102 may itself be coupled to a third bin 103. As the vehicle moves, the bins are pulled along together on their wheels 104. Each bin has a cross member 105 which may be coupled to a handle of the adjoining bin to create a connected train of bins.

Figure 2:
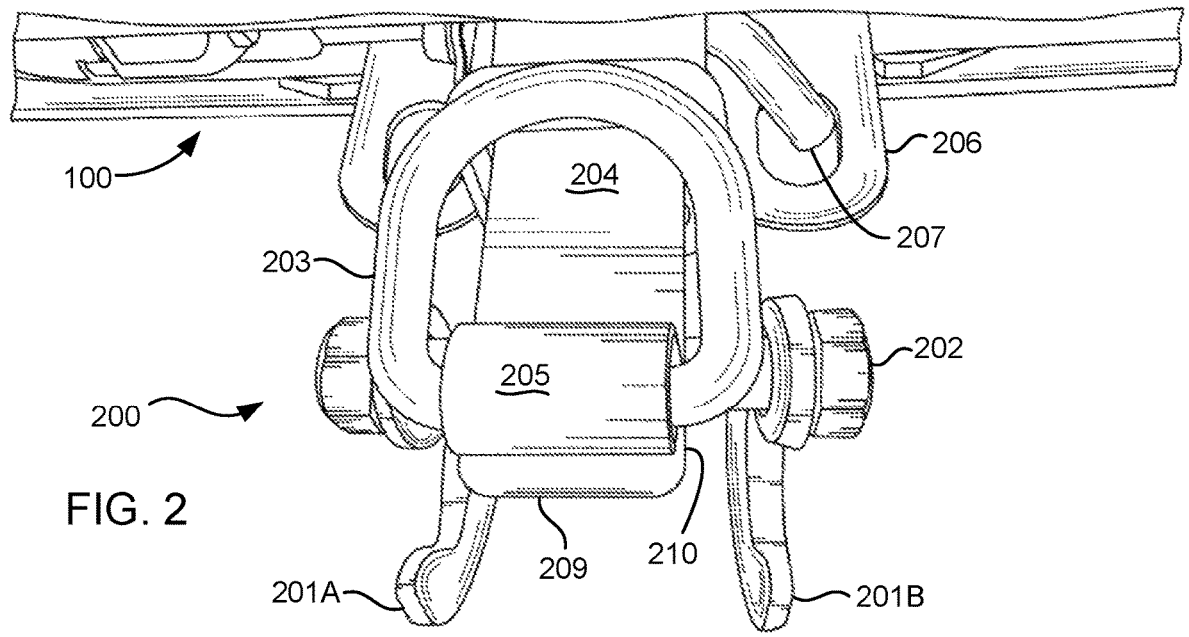
FIG. 2 is a top view of the apparatus connected to the vehicle.
Figure 3:
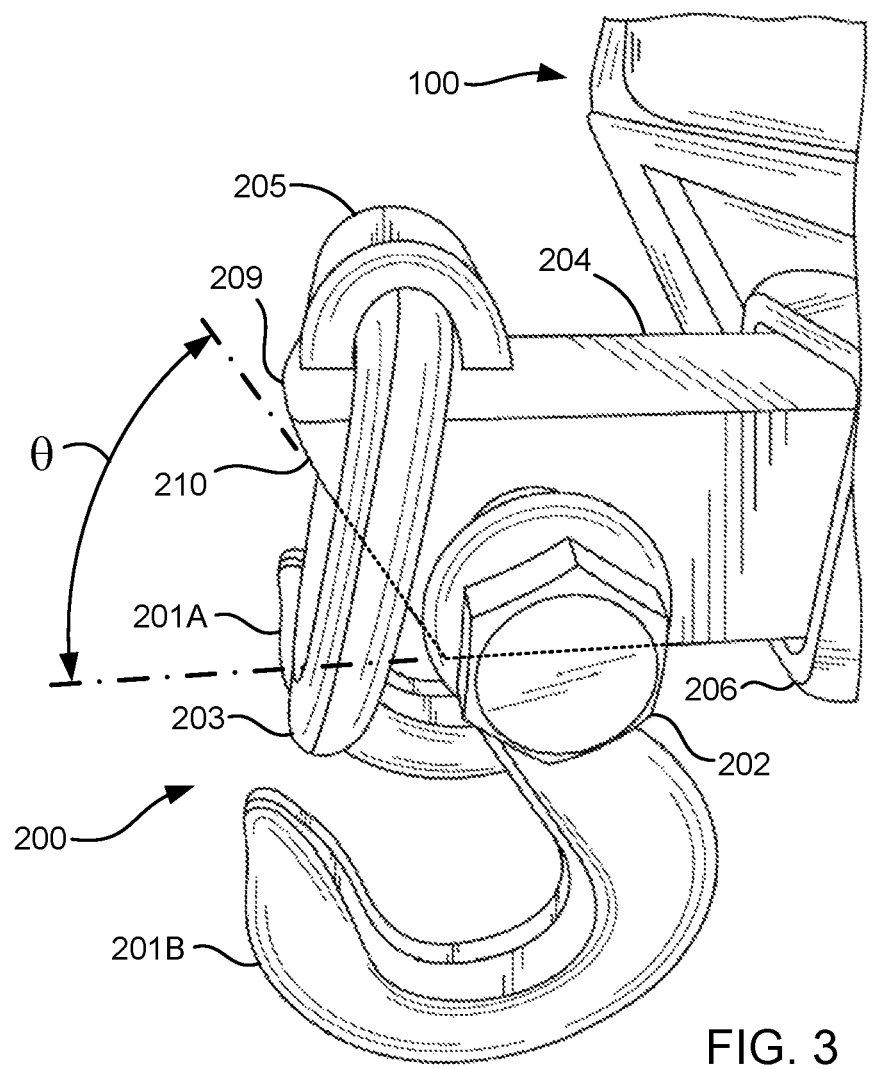
FIG. 3 is a side view of the apparatus of FIG. 2, with certain elements removed or added for further illustration purposes.

FIG. 2 illustrates a top view of the apparatus while connected to the vehicle 100. FIG. 3 illustrates a side view of the apparatus of FIG. 2. The apparatus 200 comprises at least one, one or more, or a pair of retainer elements or retainers or hooks 201A, 201B, which pivot about fastener 202 mounted to a first end of a longitudinally extending shaft 204. The fastener 202 may be a through-bolt or some other means to rotatably attach the retainers or hooks 201A and 201B to shaft 204. The apparatus 200 also may include in certain configurations a D-ring 203 rotatably mounted in a collar 205 carried from the shaft 204.

When in use for some configurations, the D-ring 203 can be rotated towards the hooks to supplement retention of an item that is received within, retained by, and/or captured by the retainers or hooks. The D-ring 203 can be mounted with a friction fit so that once a preferred orientation is selected or configured, D-ring 203 tends to stay in the chosen location without much, if any movement, so as to further secure the item received within or retained by the retainers or hooks 201A, 201B. In one exemplary configuration, D-ring 203 is also configured to operate as a tie down point to further secure an item to the connector apparatus. The shaft 204 extends to a second end that engages a connection 206 on the vehicle 100, such as what may sometimes be referred to as a tow hitch, to secure the coupler apparatus 200 to the vehicle 100.

Figure 4:
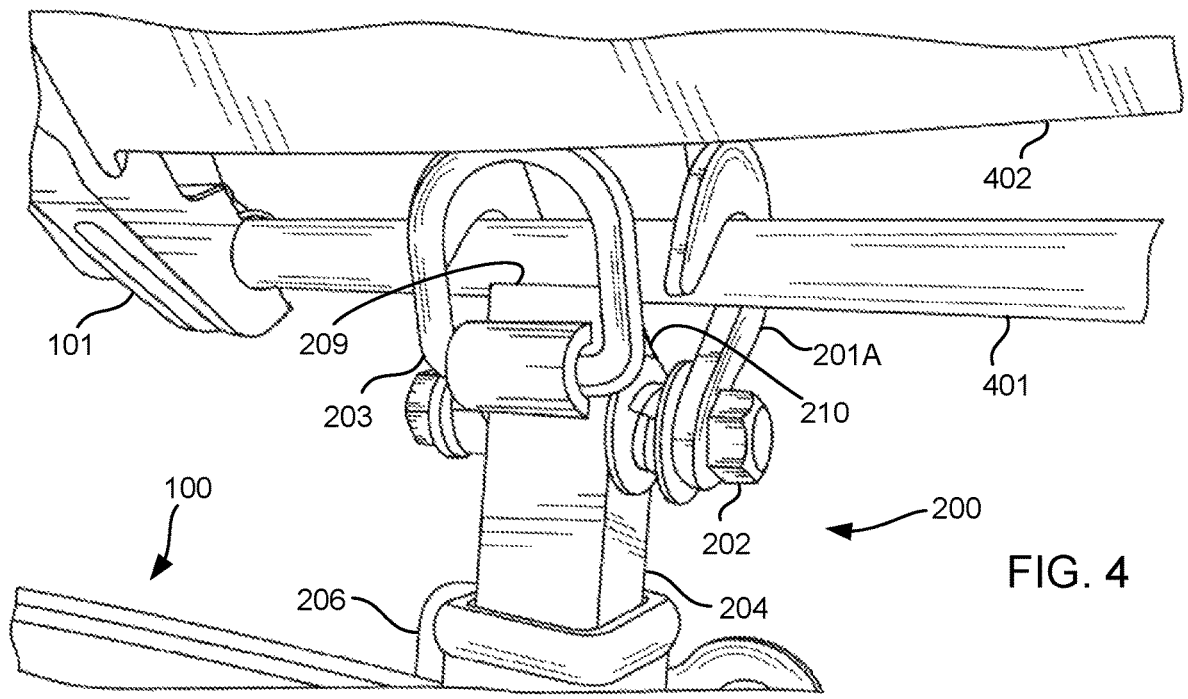
FIG. 4 is a top view of the apparatus of FIG. 2 attached to a handle or bar of a trash bin.
Figure 5:
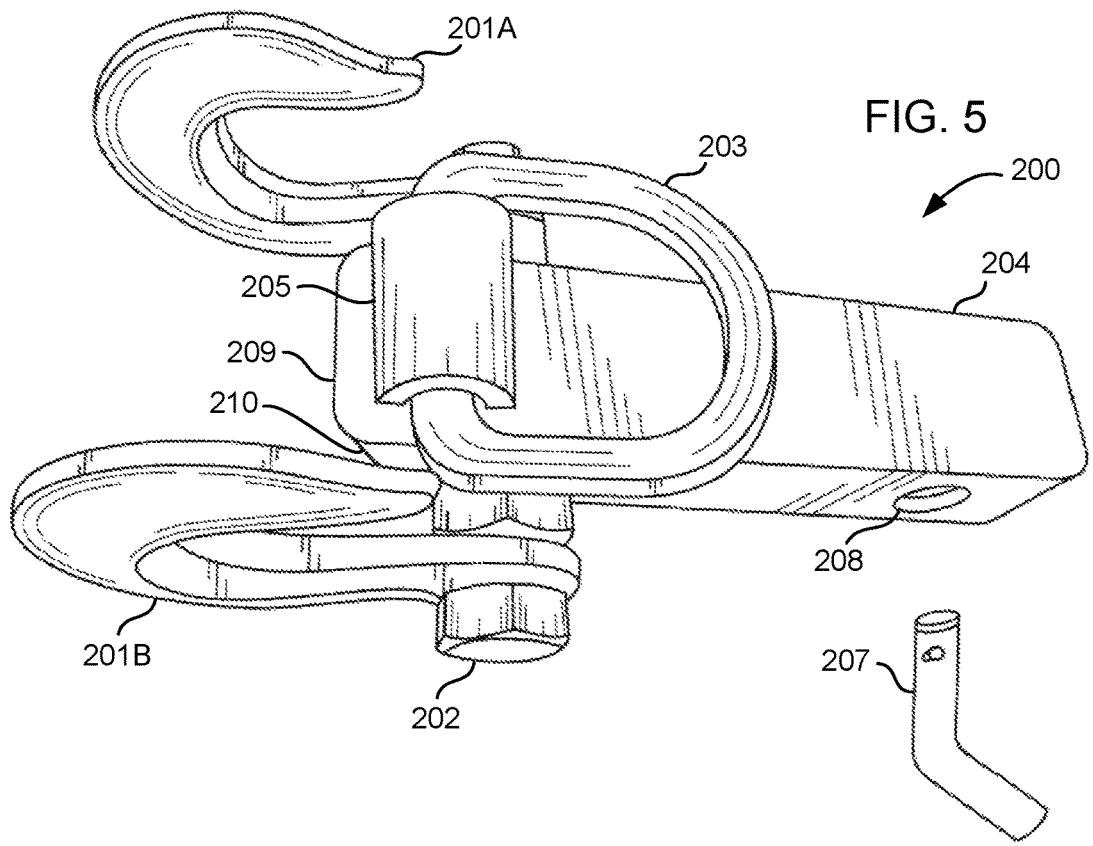
FIG. 5 is a top view of the coupler or connector apparatus of the preceding figures, with certain elements removed or reoriented.

FIG. 4 illustrates the apparatus 200 engaged with first bin 101. The at least one or one or more retainer elements or hooks 201A, 201B are depicted to receive a handle 401, which may be proximate to a top portion of the first bin 101 and near a lid 402. The D-ring 203 is moved to the top of the handle 401 to supplement and/or retain handle 401 in place in the retainers or hooks during transport, alone and/or in combination with other elements of coupler apparatus 200. The shaft 204 is coupled to connection 206 of vehicle 100 with a heavy pin 207 that is secured with a cotter pin, or by some other fastening means, and received within throughhole 208 formed in shaft 204 as depicted in FIGS. 2 and 5.

The shaft 204 extends longitudinally away from the connection 206 of vehicle 100 to the first end, which terminates at an upper extended edge 209, as reflected in the various figures, including for example FIG. 3. In this figure, it can be understood that shaft 204 is formed at the first end with an anvil face 210, which is angled relative to the longitudinally extending shaft 204, about an angle θ (Greek alphabet lowercase letter theta). Angle θ is predetermined according to the desired application and performance requirements, and such that the hooks 201A, 201B cooperate with the angled anvil face 210 to capture the handle 401 of the first bin 101. See, for example, FIGS. 3 and 4.

In an exemplary arrangement, D-ring 203 may be oriented about an upper surface of shaft 204 as depicted in FIG. 2, while the one or more retainers or hooks 201A, 201B may oriented in a relative downward direction or hanging orientation as shown in FIG. 3. In these arrangements, an item such as handle 401 of bin 101, may be received and captured within the one or more retainer elements or hooks 201A and 201B, such that D-ring 203 may then be rotated to rest on top of received handle 401, as reflected in FIG. 4.

During operation, as vehicle 100 proceeds to tow first bin 101 and/or the train of bins 101, 102, 103, the tow force imparted by vehicle 100 to coupler apparatus 200 causes hooks 201A, 201B to dynamically and responsively rotate upwards. In this configuration, retainers or hooks 201A, 201B thereby transmit an operational pulling or applied load against a received or captured item, such as handle 401, to bias such into contact with and against anvil face 210, thereby retaining and capturing the item, such as handle 401, therebetween during towing operations. In this arrangement, retainer elements or hooks 201A, 201B cooperate with angled anvil face 210 in a dynamically and automatically adjustable jaw-like or wrench-like mechanical action, which is proportionally responsive to the force or loads imposed as coupler or connector apparatus 200 is utilized during such towing or pulling operation.

Conversely, unlike static tow connectors that may jam during use, and which remain jammed thereafter and require extra tools to release captured items, the configurations disclosed herein contemplate and enable quick-release of the captured item such as handle 401 or any other captured item, once the pulling, applied, or towing force or load subsequently subsides. Those skilled in the relevant fields of technology may be able to comprehend that when the force or load imposed during operation is abated, the one or more or at least one retainer element and/or hook 201A, 201B is easily rotated away from angled anvil face 210, such that the captured item, for example bin handle 401, is quickly and easily released and removable.

The shaft 204 is also configured such that a user can stand on the shaft 204, when connected to vehicle 100, to reach a roof or roof rack of the vehicle as desired. In one embodiment, the apparatus is comprised of specially coated, corrosion resistant, and hardened steel. Additional bins or material movers may be added to the train by coupling of multiple bins or movers together, such as by coupling the cross member 105 of one bin to the handle 401 of a next bin, using any suitable device such as a tie down including bungee or EPDM trucker's cords, chains, rope, and the like.

Additionally, coupler apparatus 200 contemplates uses to transport materials on materials movers such for example skids, pallet trucks or jacks, dollies, carts or wagons, and for towing and recovery operations. While depicted here as compatible for use with an exemplary tow hitch often found in use with commercial and consumer vehicles, coupler apparatus 200 can also be configured for and is also compatible for use with a wide variety of similarly capable all terrain and utility terrain vehicles (ATVs, UTVs), tractors, wreckers, tow vehicles and trucks, winch machines and vehicles, cranes, and similar types of industrial and utility vehicles, among others.

In further variations, shaft 204 may be configured in other arrangements that may include rectangular (as depicted for example without limitation in the figures), circular, and other suitable shapes, and combinations thereof. Connector or coupler apparatus 200 also contemplates various dimensions for different applications. In another example, shaft 204 may be formed to have an approximate 2 inch square end for connection with commonly used commercial and automotive hitch connections 206. Shaft 204 may extend from connection 206 approximately between five and ten inches.

Modifications of connector or coupler apparatus 200 are depicted in FIG. 3, among other figures, and may include anvil face 210 to have an angle θ of between about 40 degrees and 75 degrees+/−five degrees, and more preferably may be about 60 degrees or so. As depicted for purposes of illustration in FIG. 3, angle θ extends between extension chain lines, which are generally shown to align with an edge of angled anvil face 210 and with a longitudinal edge of shaft 204. The angled anvil face 210 can be observed in view of hidden edges of angled anvil face 210 as such are illustrated schematically with dashed, hidden lines.

Exemplary variants may include at least one and/or one or more retainers, retainer elements, and/or hooks 201A, 201B to be what are often referred to by some working in the field of technology as ⅜" forged hooks, and to have an example length extending approximately five inches or more or less, which can vary according to a specific, preferred application and/or configuration.

In still other modifications, coupler apparatus 200 may be configured for and utilized to receive and, under load and during operation, to dynamically grip or capture items other than the contemplated bins 101, 102, 103. Specifically for further examples, coupler 200 may dynamically receive, capture, grip, and manipulate other types of handles, wire ropes, chains, vines, or utility and emergency materials, wagons, dollies, pallet trucks, and similar devices.

Like with the preceding example uses with bin handles 401, during operation the force applied by vehicle 100 to connector or coupler apparatus 200, dynamically actuates the one or more retainers or hooks 201A, 201B, responsive to the applied loads or forces during operation. The applied force dynamically, and proportionally in response to the applied load, actuates or forces exemplary retainers or hooks 201A, 201B to rotate upwardly to positively retain a received or captured item, such as a handle 401.

In turn, the operationally applied force is proportionally transmitted thereby as a force that biases the captured item and retains it against anvil face 210, in a self-tightening, self-tensioning jaw or wrench force-responsive arrangement. While demonstrated herein in one exemplary configuration, other geometries of one or more retainers or hooks 201A, 201B or similarly capable elements can be utilized, as can capture devices unlike the depicted hooks, to enable the contemplated automatic and dynamic capture, clamping, and gripping capabilities.

The descriptions herein refer to systems, methods, constituents, components, elements, or features being coupled together, and/or interacting together and with other components. As used herein, unless expressly stated otherwise, use of these terms and words are intended and must be understood to mean that one component/constituent/method/element/feature is directly or indirectly mechanically coupled, joined to, interactive with, responsive to, and/or cooperative with others.

Further, even though the various described implementations, figures, illustrations, and drawings depict representative examples and arrangements of components, elements, devices, and features, many different additional variations, arrangements, modifications, and intervening components, elements, devices, and features, may also be present in further exemplary implementations that are contemplated by the present disclosure.

Terms, words, and phrases used in this document, and variations thereof, unless otherwise expressly stated, must be construed as open ended as opposed to limiting. For example, the term "including" should be understood to mean "including, without limitation" or similar meanings; the term "example" is used to loosely describe illustrative instances of the item being described, but is not an exhaustive, exclusive, or limiting list; and adjectives such as "conventional," "traditional," "normal," "standard," "known", and terms with similar meanings must not be construed to limit the description to a given example, or to an exemplary item commercially available in the market as of a specific date and time period.

Instead, these descriptions are intended to be understood to include conventional, traditional, normal, or standard technologies that may be available now and at any time in the future in some improved and modified form according to the innovations described in this disclosure. Similarly, a group of words described and joined with the conjunction "and" or the disjunctive "or" must be understood only as exemplary and representative but not exclusive groups, and not as requiring that only or each and every one of those described items must be or must not be present in the contemplated group. Rather, use of such conjunctives and disjunctives must be understood to mean "and/or" unless expressly stated otherwise.

Also, although words, items, elements, or components of this disclosure are described or claimed in the singular, the plural is also intended and contemplated to be within the scope of such a description unless limitation to the singular is explicitly stated as a requirement. The presence or absence of broadening words and phrases such as "one or more," "at least," "but not limited to" or other like phrases in some instances are intended to be interpreted to contemplate broader meanings, but must not be understood to mean that narrower meanings are implied, intended, or required.

What is claimed is:

1. A coupler apparatus comprising:
   a shaft having a length, a first end and a second end;
   a pair of hooks rotatably mounted one either side of the first end of the shaft, and configured to cooperate with the first end of the shaft to capture an item therebetween wherein the pair of hooks rotate about an axis perpendicular to the length of the shaft to dynamically actuate one or more hooks of the pair of hooks; and
   a heavy pin receivable at the second end of the shaft configured to couple the apparatus to a vehicle.

2. The coupler apparatus according to claim 1, further comprising:
   a fastener received within a through hole formed in the first end of the shaft; and
   the hooks rotatably mounted by the fastener about opposite sides of the shaft.

3. The coupler apparatus according to claim 1, further comprising:
   a D-ring rotatably mounted at the first end of the shaft adjacent the pair of hooks; and
   a collar carried from the first end of the shaft, received with the D-ring in a friction fit relationship to resist movement relative to at least one of the pair of hooks and shaft.

4. The coupler apparatus according to claim 3, further comprising:
   a D-ring rotatably mounted at the first end of the shaft adjacent the pair of hooks; and
   the collar and through hole being positioned relative to the pair of hooks such that the D-ring is rotatable into a position proximate the hooks to rest against the item received within the hooks.

5. The coupler apparatus according to claim 1, further comprising:
   a fastener received within a through hole formed in the first end of the shaft and rotatably mounting the pair of hooks;
   a D-ring rotatably mounted at the first end of the shaft adjacent the pair of hooks;
   a collar carried from the first end of the shaft, received with the D-ring in a friction fit relationship to resist movement relative to at least one of the pair of hooks and shaft; and
   the D-ring is rotatable into a position proximate the hooks to retain the item received within the hooks.

6. The coupler apparatus according to claim 1, further comprising:
   a fastener received within a through hole formed in the first end of the shaft; the pair of hooks rotatably mounted by the fastener about opposite sides of the shaft;
   a D-ring rotatably mounted at the first end of the shaft adjacent the pair of hooks; and
   a collar carried from the first end of the shaft, and the D-ring captured by the collar in a friction fit relationship to resist movement relative to at least one of the pair of hooks and shaft.

7. The coupler apparatus according to claim 1, further comprising:
   a fastener received within a through hole formed in the first end of the shaft, configured to rotatably mount the pair of hooks about opposite sides of the shaft;
   a D-ring rotatably mounted at the first end of the shaft adjacent the pair of hooks; and
   the D-ring configured to be rotated into a position adjacent the hooks to retain the item received therein.

8. The coupler apparatus according to claim 1, further comprising:
   the first end formed with an upper edge and an angled anvil face, configured to cooperate with the hooks during operation to retain the item received therein.

9. The coupler apparatus according to claim 1, further comprising:
   a D-ring rotatably mounted at the first end of the shaft adjacent the pair of hooks; and
   the D-ring captured in a friction fit relationship relative to the first end of the shaft, and positioned thereon relative to the pair of hooks, to be rotated into a position adjacent the hooks to retain the item received therein.

10. An apparatus comprising:
    a shaft having a first end, formed with an angled anvil face, and a second end each with respective through holes;
    a pair of hooks rotatably mounted by a fastener captured by the through hole of the first end of the shaft, and configured to cooperate with the angled anvil face to retain an item; and
    a D-ring rotatably mounted in a friction fit relationship at the first end of the shaft, adjacent the pair of hooks.

11. The apparatus according to claim 10, further comprising:
    the hooks rotatably mounted by the fastener about opposite sides of the shaft.

12. The apparatus according to claim 10, further comprising:
    a collar carried from the first end of the shaft, received with the D-ring to establish the friction fit relationship.

13. The apparatus according to claim 12, further comprising:
    the collar and first end through hole being positioned relative to the pair of hooks such that the D-ring is rotatable towards the hooks to retain an item received therein.

14. The apparatus according to claim 10, further comprising:
    a collar carried from the first end of the shaft, received with the D-ring to establish the friction fit relationship to resist movement of the D-ring relative to the first end; and
    the collar and fastener configured such that the D-ring is rotatable towards the hooks to retain a handle received therein.

15. The apparatus according to claim 10, further comprising:
    the angled anvil face configured to cooperate with the hooks rotating during operation to retain the item received therein.

16. An apparatus comprising:
    a shaft extending longitudinally between first and second ends each with respective through holes; at least one hook rotatably mounted by a fastener received within the through hole of the first end of the shaft; and the first end formed with an angled anvil face configured to cooperate with the at least one hook to receive and retain an item.

17. The apparatus according to claim 16, further comprising:

a collar carried from the first end of the shaft, received with a D-ring rotatably mounted therein to establish a friction fit and resistance to movement.

18. The apparatus according to claim 17, further comprising:

the collar and fastener configured such that the D-ring is rotatable towards the hook to retain the item received therein.

19. The apparatus according to claim 16, further comprising:

the hook rotatably mounted by the fastener about a side of the shaft.

20. The apparatus according to claim 16, further comprising:

a collar carried from the first end of the shaft, rotatably received with a D-ring to establish a friction fit and resistance to movement, and positioned relative to the at least one hook whereby the D-ring is rotatable towards the at least one hook to retain the item against the angled anvil face.

* * * * *